United States Patent [19]

Owen

[11] Patent Number: 5,071,097
[45] Date of Patent: Dec. 10, 1991

[54] ADJUSTMENT APPARATUS AND METHOD

[75] Inventor: Donald W. Owen, Yukon, Okla.

[73] Assignee: International Pool Player Association, Inc., Oklahoma City, Okla.

[21] Appl. No.: 497,102

[22] Filed: Mar. 21, 1990

[51] Int. Cl.$^5$ .............................................. F16M 11/24
[52] U.S. Cl. ................................ 248/188.4; 180/150
[58] Field of Search ....................... 248/188.4, 157, 649, 248/650, 161, ; 108/150, 144; 312/255, 253

[56] References Cited

U.S. PATENT DOCUMENTS

| | | | |
|---|---|---|---|
| 287,913 | 11/1883 | Simpson et al. | 248/188.4 |
| 640,960 | 1/1900 | Seely | 248/188.4 |
| 785,982 | 3/1905 | Smith | 248/188.4 |
| 842,641 | 1/1907 | Fernau | 248/188.4 |
| 948,708 | 2/1910 | Sheppard | 248/188.4 |
| 1,056,785 | 3/1913 | Finney | 248/188.4 |
| 1,123,960 | 1/1915 | Von Der Lin | 248/188.4 |
| 1,125,668 | 1/1915 | Deming | 248/188.4 |
| 2,850,309 | 9/1958 | Grover et al. | 248/188.4 X |
| 3,438,606 | 4/1969 | Rubin | 108/150 X |
| 3,653,341 | 4/1972 | Nielsen | 248/188.4 X |

Primary Examiner—Renee S. Luebke
Assistant Examiner—Suzanne L. Dino
Attorney, Agent, or Firm—Laney, Dougherty, Hessin & Beavers

[57] ABSTRACT

An apparatus for facilitating adjustment of an adjustable foot comprises a base and an anti-friction element which allows the fully loaded foot to rotate with respect to the base. The apparatus may be attached to the foot, or it may be inserted under the foot but otherwise detached from it. In use, the base rests upon the floor and supports the anti-friction element and the foot; and the anti-friction element is positioned between the base and the foot. When a foot is placed upon the apparatus, the foot may be adjusted to affect the pitch of the table surface by applying torque to the foot. The foot rotates while the base remains stationary. A foot receiving plate, which is supported on the anti-friction element and in use rotates with the foot, can also be included in the apparatus. In one embodiment, the foot receiving plate includes support tiers, each of which is sized to accommodate a different size foot. Related methods for adjusting the height of an object and specifically for leveling a pool table are also disclosed.

29 Claims, 2 Drawing Sheets

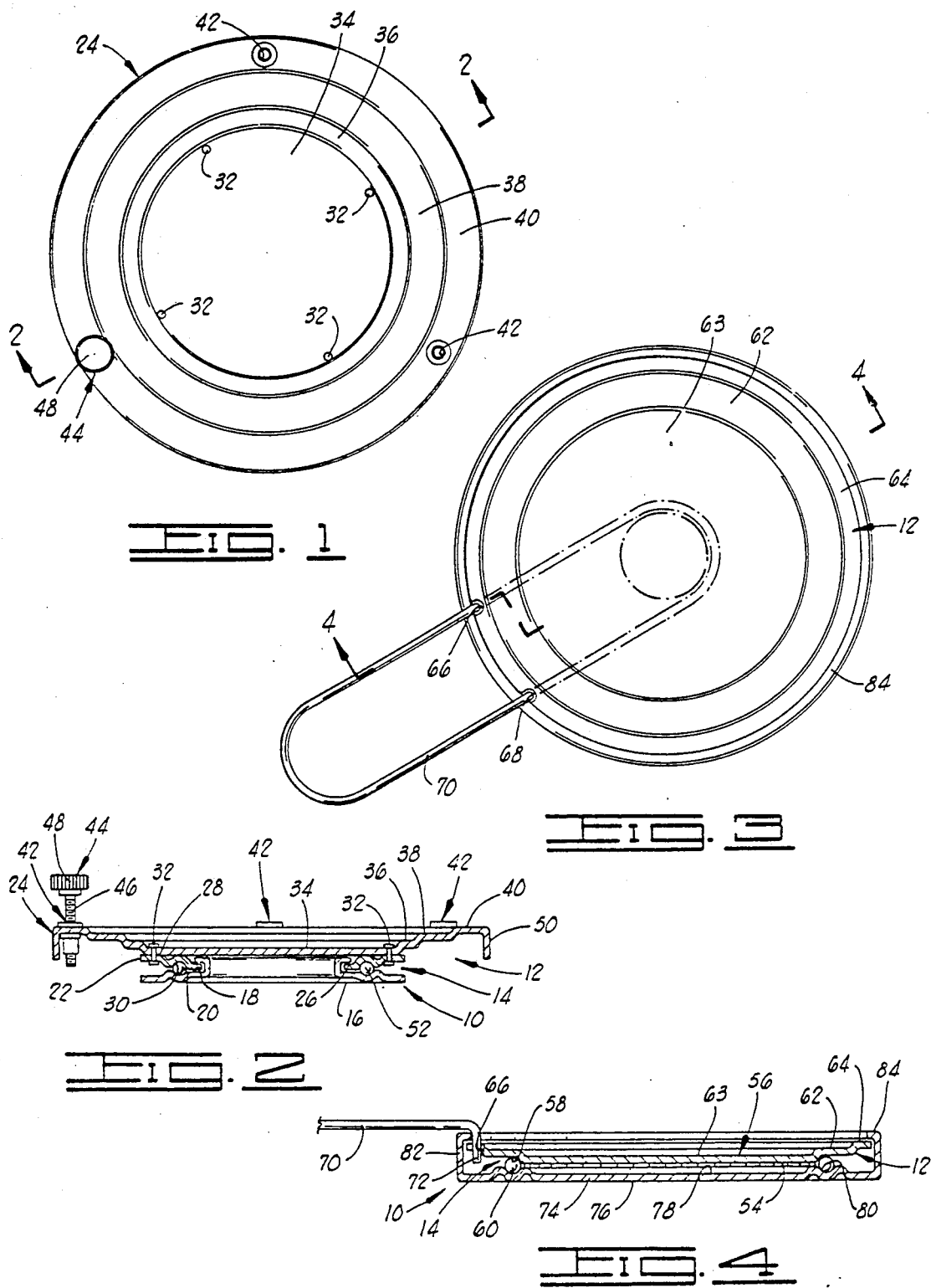

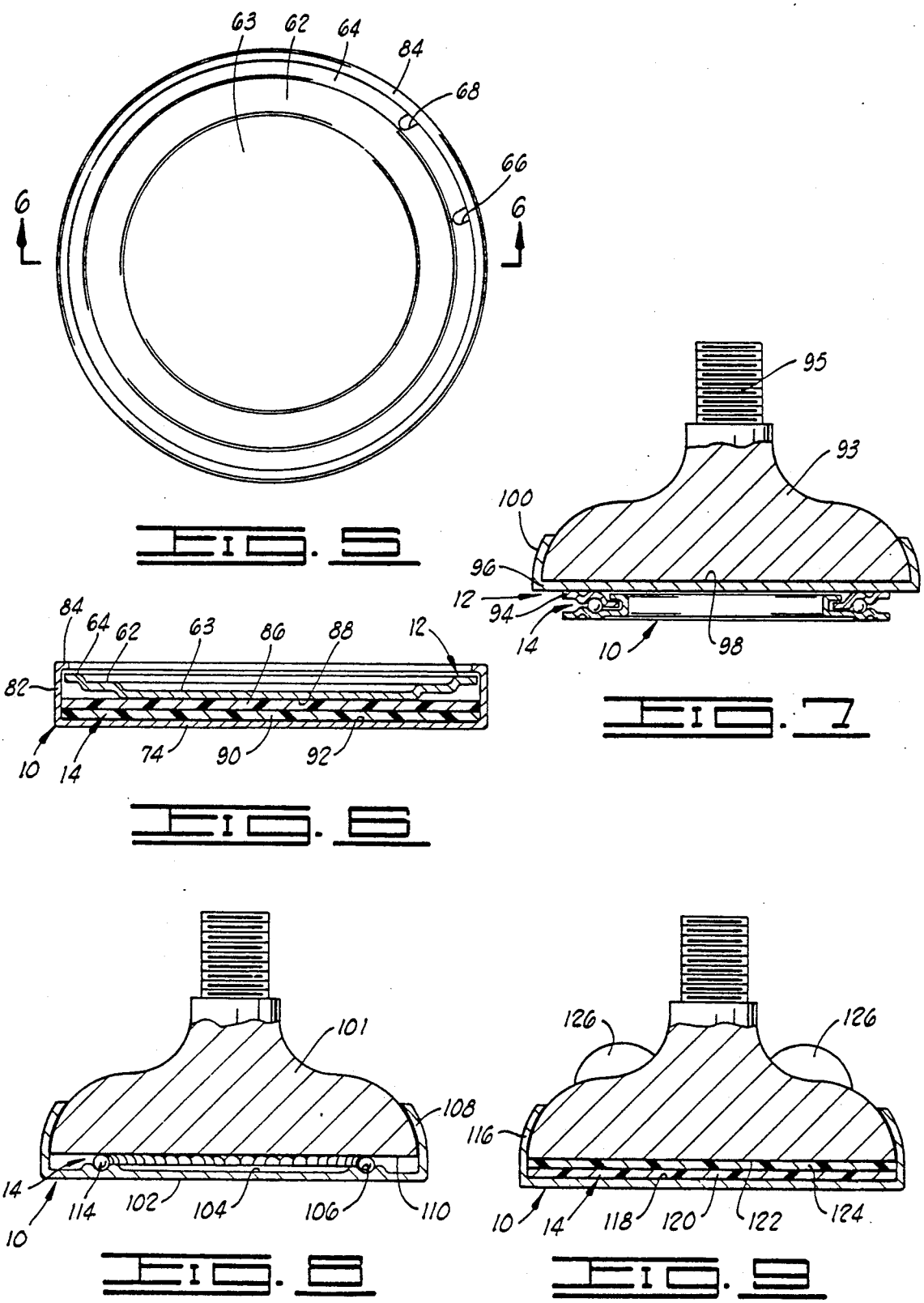

5,071,097

ADJUSTMENT APPARATUS AND METHOD

BACKGROUND OF THE INVENTION

This invention relates generally to an apparatus and method for adjusting an adjustable foot connected to an object. The invention more particularly, but not by way of limitation, relates to an apparatus and method for facilitating the adjustment of a pool table foot without lifting the table's weight from the foot.

For certain types of equipment or furniture, a level surface is desirable or necessary. Leveling is often accomplished by providing a threaded foot on the end of each leg that supports the surface. Each foot may be rotated to vary the height of each leg, which in turn varies the pitch of the surface. By adjusting each foot appropriately, the surface can be leveled and held in position.

Generally, a foot of this type rests on the floor and supports the weight placed on the leg. The weight supported by the foot, the relatively high friction bottom of the foot, and the smooth top surface of the foot prevent adjustment when the foot is supporting any significant weight. As a result, the weight usually must be lifted from the foot to permit adjustment.

The leveling of a surface thus becomes a repetitive process of measuring the surface's pitch, lifting the weight from the appropriate legs, adjusting the feet, and returning the weight to the legs. This process is repeated until the requisite levelness is achieved.

The surface of a pool table must be absolutely level to insure the fairness of the game. Pool tables, however, are relatively heavy, so that repeatedly lifting the table's weight from the feet is laborious and time-consuming. Consequently, leveling a pool table or similar surface presents a slow and tedious process. There is therefore a need for an apparatus and method that allows a foot to be adjusted without removing the weight from the foot.

SUMMARY OF THE INVENTION

The present invention overcomes the above-noted and other shortcomings by providing a novel and improved apparatus and method for adjusting a furniture foot and the like. The present invention is designed to rest on the floor and support the foot, while allowing the foot to be adjusted under a full load. The height or levelness of an object supported on the foot can thus be adjusted by applying torque to the foot, or to the part of the invention that receives the foot, and rotating it while leaving the object's weight on the foot and the apparatus. The present invention is also designed to prevent the foot from slipping laterally, thereby securely retaining the horizontal position of the foot and the object to which it is connected. The present invention is further designed to be relatively short and flat to avoid adding significantly to the object's height.

The present invention provides an apparatus for facilitating rotation of an adjustable foot, comprising: a base; and anti-friction means for positioning between the foot and the base for allowing the foot to rotate with respect to the base when torque is applied. In a preferred embodiment, the apparatus is attached to the bottom of the foot, such as during manufacture of the object having the adjustable foot. In another preferred embodiment, in which the invention is not attached to the foot, the invention is inserted between the floor and the foot. Either embodiment can include a foot receiving plate. This apparatus is particularly useful in leveling a pool table.

Although the present invention has broader application, in a preferred embodiment it provides a method for leveling a pool table including a playing surface and adjustable feet, comprising: providing under each of a plurality of said feet a respective apparatus each of which includes a base and a rotatable coupling disposed between the base and the respective foot to allow the foot to rotate with respect to the base; and rotating selected ones of the feet on their respective rotatable couplings to adjust the pitch of the playing surface until the playing surface is level without lifting up on the pool table during the rotating.

Therefore, it is an advantage of the present invention to provide a novel and improved apparatus and method for facilitating rotation of an adjustable foot. Other features and advantages of the present invention will be apparent to those skilled in the art when the following description of the preferred embodiments is read in conjunction with the accompanying drawings.

BRIEF DESCRIPTION OF THE DRAWINGS

FIG. 1 shows a plan view of a first embodiment of the present invention wherein a foot receiving plate has a plurality of foot receiving tiers.

FIG. 2 shows a sectional elevational view of the embodiment illustrated in FIG. 1, as taken along line 2—2 shown in FIG. 1.

FIG. 3 shows a plan view of a second embodiment of an apparatus of the present invention.

FIG. 4 shows a sectional elevational view of the embodiment illustrated in FIG. 3, as taken along line 4—4 shown in FIG. 3.

FIG. 5 shows a plan view of a third embodiment of an apparatus of the present invention.

FIG. 6 shows a sectional elevational view of the embodiment illustrated in FIG. 5, as taken along line 6—6 shown in FIG. 5.

FIG. 7 shows a sectional elevational view of a fourth embodiment of an apparatus of the present invention.

FIG. 8 shows a sectional elevational view of a fifth embodiment of an apparatus of the present invention.

FIG. 9 shows a sectional elevational view of a sixth embodiment of an apparatus of the present invention.

DETAILED DESCRIPTION OF THE PREFERRED EMBODIMENTS

In the preferred embodiments described herein, the present invention provides an apparatus and method for adjustment of a threaded table foot without removing the table's weight from the foot. The preferred embodiments are specifically adapted for use with pool tables. Each embodiment to be described includes a base 10 and means 14 for reducing friction (herein referred to as anti-friction means), and some further include a foot receiving plate 12. Although each of these may vary in detail from embodiment to embodiment, these same reference numerals are used throughout.

In the preferred embodiment shown in FIG. 1 and FIG. 2, the present invention includes base 10, foot receiving plate 12, and anti-friction means 14.

The base 10 of this embodiment is square and includes a floor surface 16 and a bearing surface 18. The floor surface 16 rests on the floor. In the embodiment shown in FIG. 2, the material of the base 10 is formed to provide a race 20 in the bearing surface 18. It is contemplated, however, that the race 20 need not be formed in the bearing surface 18, but may be placed on the bearing surface 18 by other means.

The foot receiving plate 12 includes a square support plate 22 and a circular seating plate 24. The support plate 22 includes a bearing surface 26 and a mounting surface 28. In the embodiment, the material of the support plate 22 is formed to provide a race 30 in the bearing surface 26. Again, it should be noted that the race 30 could be attached to the bearing surface 26 by other means.

The seating plate 24 is mounted on the mounting surface 28 of the support plate 22 by means of four rivets 32 through the circular central portion 34 of the seating plate 24. The seating plate 24 further includes a series of concentric tiers 36, 38 rising above and concentric with the central portion 34. The tier 36 is raised above the central portion higher than the heads of the rivets 32. The tier 38 has a larger diameter than the tier 36 and is raised above the tier 36. A seating rim 40, having a larger diameter than the tier 38 and raised above the tier 38, is also concentric with the central portion 34 and the tiers 36, 38. When the foot of a table is placed upon the seating plate 24, the foot is supported by one of the tiers 36, 38. A small foot is received on the tier 36 and the raised second tier 38 provides a peripheral boundary which prevents lateral slippage of the foot, thereby axially centering the foot relative to its center of rotation on the apparatus and securing the foot against lateral movement off the plate. A larger foot will rest on the tier 38 while the seating rim 40 acts as the peripheral retaining wall to prevent lateral slippage and maintain centering. Variations in foot size may be accommodated by different sizes of tiers 36, 38 or further tiers. In the preferred embodiment the tiers 36, 38 are sized to accommodate two standard sizes of pool table foot.

The seating rim 40 of the seating plate 24 has three threaded holes 42. Each of the holes 42 may receive a handle 44, shown in the embodiment as a threaded bolt 46 and a connected head or knob 48. The handle 44 facilitates the application of torque to the foot receiving plate 12 to rotate the foot receiving plate 12 and a mounted foot. When the appropriate position is achieved, the handle 44 may be screwed down through the hole 42 to engage the floor and lock the foot receiving plate 12 in position.

The seating plate 24 further includes a cylindrical flange 50 extending axially towards the base 10 from the seating rim 40.

The anti-friction means 14 in this embodiment includes a plurality of ball bearings 52. The ball bearings 52 are positioned in the race 20 of the base 10 and the race 30 of the support plate 22. The ball bearings 52 maintain a separation between the base 10 and the foot receiving plate 12, and allow the foot receiving plate 12 to rotate freely relative to the base 10. The base 10 and support plate 22 are held together in a known and conventional manner as shown in FIG. 2.

A second embodiment of the present invention is illustrated in FIG. 3 and FIG. 4. The second embodiment shows the present invention wherein the foot receiving plate 12 comprises a single circular plate having a bearing surface 54 and a seating surface 56. The bearing surface 54 includes a race 58 to support the foot receiving plate 12 on a plurality of ball bearings 60. As in the first embodiment, the seating plate 56 includes an annular tier 62 for receiving a relatively large foot. A lower tier is defined by the lowermost portion 63 of the seating surface 56.

The foot receiving plate 12 includes a seating rim 64 having two spaced holes 66, 68. A handle 70 may be attached to the foot receiving plate 12 by inserting a pair of prongs 72 on the handle 70 into the holes 66, 68. The handle 70 may then be used to apply torque to the foot receiving plate 12 to rotate the foot. When not in use, the handle 70 may be looped around a mounted foot and the prongs 72 reinserted into the holes 66, 68, as shown by the broken lines in FIG. 3.

The base 10 includes a circular floor plate 74 having a floor surface 76 and a bearing surface 78. As in the first embodiment, an annular race 80 is defined in the bearing surface 78 of the floor plate 74. The base 10 further includes a cylindrical rim 82 extending perpendicular to the plane of the floor plate 74 and connected to the outer edge of the floor plate 74. The rim 82 encircles the foot receiving pate 12 and has an annular flange 84 extending radially inward from the rim 82. The flange 84 has a smaller inner diameter than the outer diameter of the foot receiving plate 12 so that the foot receiving plate 12 is held between the floor plate 74 and the flange 84.

The anti-friction means 14 includes ball bearings 60 as described in the first embodiment, held between the race 80 in the base 10 and the race 58 in the foot receiving plate 12.

A third embodiment, illustrated in FIG. 5 and FIG. 6, shows the present invention as illustrated in the second embodiment, but employing a different type of anti-friction means. No races are included in either the base 10 or the foot receiving plate 12, but these are otherwise the same as in FIG. 3 and FIG. 4 as indicated in part by like reference numerals. The anti-friction means 14 includes a disk of low-friction material 86, such as TEFLON ® or polyethylene, adjacent to the bearing surface 88 of the foot receiving plate 12. Another disk of low-friction material 90 is adjacent to the bearing surface 92 of the base 10. The friction between the disks 86, 90 is sufficiently low to permit the foot receiving plate 12 to rotate with respect to the base 10 when torque is applied.

It is contemplated that only one of the disks 86, 90 may be needed; however, using at least two disks should provide a more reduced friction boundary than using only one disk.

FIG. 7 illustrates a fourth embodiment in which the present invention is attached to a foot 93 having a threaded shank 95 (e.g., a pool table foot). The apparatus includes base 10, anti-friction means 14, and foot receiving plate 12. The foot receiving plate 12 includes a support plate 94 and a seating plate 96. The base 10, anti-friction means 14, and support plate 94 are identical to the respective elements described in the first embodiment in FIGS. 1 and 2. The seating plate 96 is suitably mounted on the support plate 94. The seating plate 96 includes a seating surface 98 which engages the bottom of the foot (the seating plate 96 can be recessed to receive rivet heads if attachment to the support plate 94 is as shown in FIG. 1 and FIG. 2). The seating plate 96 further includes an annular, upwardly and inwardly curving shoe 100, which overlaps the outside of the foot 93 and holds the foot to the apparatus.

A fifth embodiment is shown in FIG. 8. The apparatus again includes base 10 and anti-friction means 14, but without a foot receiving plate. The base is attached to a threaded foot 101 and the foot rests directly upon the anti-friction means 14.

The base 10 includes a floor surface 102, which rests on the floor, and a bearing surface 104. The bearing surface 104 includes an annular race 106 which may be either attached to or formed into the material of the bearing surface 104. The base 10 further includes a shoe 108 which overlaps the outside of the foot 101 and holds the foot to the apparatus.

The foot 101 includes a bearing surface 110, which may but need not have a race. If present, the race may be formed in the material of the bearing surface 110 or attached to it. The anti-friction means 14 includes a plurality of ball bearings 114 positioned between the race 106 on the base 10 and the foot 101.

FIG. 9 illustrates a sixth embodiment, similar to the fifth embodiment in FIG. 8, but employing low-friction material as the anti-friction means instead of ball bearings. The base 10 comprises a shoe 116 and a bearing surface 118 which does not need a race. Instead, a disk of low-friction material 120 is carried on the bearing surface 118.

A foot 121 includes a bearing surface 122 adjacent which is a disk of low-friction material 124. The friction at the junction of the disks 120, 124 is sufficiently low that the foot 121 may be rotated with respect to the base 10 when torque is applied to the foot. It should be noted that only one of the disks 120, 124 need be included in the anti-friction means 14.

The anti-friction means may be varied from the preferred embodiments described. For example, a similar result may be achieved by applying a coating of low friction material to either or both bearing surfaces. Another variation includes constructing either or both bearing surfaces from low friction material to achieve similar results.

The apparatus as illustrated in FIG. 9 further includes a pair of wing-type handles 126 mounted on the foot 121. The handles 126 facilitate the application of torque to the foot 8.

In the illustrated embodiments the base 10 and the foot receiving plate are made of metal but any other suitable material having sufficient load support strength can be used. Each illustrated plate is an integral piece, but it is contemplated that other constructions can be used.

From the above description, it should be apparent that the present invention allows adjustment of the foot without lifting the table's weight off the foot. When the base is on the floor and the apparatus supports the foot and the table's weight, the anti-friction means allows the foot to be rotated by a relatively small torsional force. As a result, a table surface may be adjusted and leveled without removing the table's weight from the foot. More generally, the present invention provides a method for adjusting the height of an object having at least one adjustable foot without removing the object's weight from the foot, comprising: a) providing a base to rest on a floor; b) providing a rotatable coupling between the base and the foot to allow the foot to rotate with respect to the base; and c) rotating the foot on the rotatable coupling to change the height of the object. Step (b) particularly includes providing a foot receiving plate and a bearing between the foot and the base, and step (c) particularly includes applying a force to a handle connected to the foot receiving plate so that the foot receiving plate and the foot are turned. In the particularly preferred embodiment, the present invention includes a method for leveling a pool table including a playing surface and adjustable feet, comprising: a) providing under each of a plurality of said feet a respective apparatus each of which includes a base and a rotatable coupling disposed between the base and the respective foot to allow the foot to rotate with respect to the base; and b) rotating selected ones of the feet on their respective rotatable couplings to adjust the pitch of the playing surface until the playing surface is level without lifting up on the pool table during the rotating.

Accordingly, the present invention is well adapted to attain the ends and advantages mentioned above as well as those inherent therein. While preferred embodiments of the invention have been described for the purpose of this disclosure, changes in the construction and arrangement of parts can be made by those skilled in the art. Furthermore, while preferred embodiments have been described with reference to tables, specifically pool tables, it is contemplated that the present invention can be used with other objects. Such changes are encompassed within the spirit of this invention as defined by the appended claims.

What is claimed is:

1. An apparatus for facilitating rotation of a pre-existing foot adjustable relative to an object normally supported at least in part by the foot on a supporting surface, said apparatus comprising an assembly adapted to be placed between the pre-existing foot and the supporting surface, said assembly including:
   a stationary base adapted to be disposed directly on the supporting surface in between the foot and the supporting surface without engaging any part of the object separate from the foot thereof; and
   anti-friction means for positioning between the foot and said stationary base for allowing the foot to rotate with respect to said stationary base disposed directly on the supporting surface when torque is applied, wherein said anti-friction means includes at least one disk comprising low-friction material disposed between said base and the foot so that said disk remains vertically stationary relative to said base when the foot rotates with respect to said base.

2. An apparatus as defined in claim 1, further comprising a handle, attached to the foot, through which torque can be applied to the foot.

3. An apparatus as defined in claim 1, wherein said base includes an annular shoe overlapping the foot so that said apparatus is secured to the foot.

4. An apparatus for facilitating rotation of a foot adjustable relative to an object normally supported at least in part by the foot on a supporting surface, said apparatus comprising:
   a stationary base adapted to be disposed directly on the supporting surface in between the foot and the supporting surface without engaging any part of the object separate from the foot thereof; and
   anti-friction means for positioning between the foot and said stationary base for allowing the foot to rotate with respect to said stationary base disposed directly on the supporting surface when torque is applied, wherein said anti-friction means includes at least one disk comprising low-friction material disposed between said base and the foot; and
   a foot receiving plate connected to said base with said anti-friction means disposed between said foot receiving plate and said base for facilitating relative movement between said foot receiving plate and said base.

5. An apparatus as defined in claim 4, wherein said base is attached to the foot.

6. An apparatus as defined in claim 4, wherein said foot receiving plate is attached to the foot.

7. An apparatus for facilitating rotation of an adjustable foot, comprising:
 a base;
 anti-friction means for positioning between the foot and said base for allowing the foot to rotate with respect to said base when torque is applied;
 a foot receiving plate connected to said base with said anti-friction means disposed therebetween; and
 a handle connected to said foot receiving plate.

8. An apparatus for facilitating rotation of an adjustable foot, comprising:
 a base;
 anti-friction means for positioning between the foot and said base for allowing the foot to rotate with respect to said base when torque is applied; and
 a foot receiving plate connected to said base with said anti-friction means disposed therebetween, wherein said foot receiving plate includes means for accommodating more than one size of foot.

9. An apparatus as defined in claim 8, wherein said means for accommodating more than one size of foot includes:
 a peripheral retaining wall; and
 a plurality of concentric support tiers connected inwardly of said retaining wall so that each tier is adapted to receive a respective size of foot within a respective peripheral boundary retaining a respective received foot against lateral movement relative to said foot receiving plate.

10. An apparatus for facilitating rotation of an adjustable foot, comprising:
 a base;
 anti-friction means for positioning between the foot and said base for allowing the foot to rotate with respect to said base when torque is applied; and
 a foot receiving plate connected to said base with said anti-friction means disposed therebetween, wherein said foot receiving plate includes:
 an outer retaining wall; and
 a support surface extending inwardly from and below the top of said retaining wall.

11. An apparatus for facilitating rotation of an adjustable foot, comprising:
 a base;
 anti-friction means for positioning between the foot and said base for allowing the foot to rotate with respect to said base when torque is applied; and
 a foot receiving plate connected to said base with said anti-friction means disposed therebetween, wherein
 said foot receiving plate includes:
 a support plate; and
 a seating plate mounted on said support plate.

12. An apparatus as defined in claim 11, wherein said seating plate includes an annular shoe overlapping the foot so that the foot is secured to said seating plate.

13. An apparatus as defined in claim 11, wherein said seating plate includes means for accommodating more than one size of foot.

14. An apparatus as defined in claim 11, further comprising a handle connected to said seating plate.

15. An apparatus for facilitating rotation of an adjustable foot, comprising:
 a base;
 anti-friction means for positioning between the foot and said base for allowing the foot to rotate with respect to said base when torque is applied;
 a foot receiving plate connected to said base with said anti-friction means disposed therebetween; and
 wherein said base includes:
 a circular floor plate;
 an annular rim extending from the perimeter of said foot plate and perpendicular to said floor plate so that said rim encircles said foot receiving plate; and
 an annular flange extending radially inward from said rim so that said foot receiving plate is positioned between said floor plate and said flange.

16. An apparatus as defined in claim 15, wherein said anti-friction means includes at least one disk comprising low friction material disposed between said base and said foot receiving plate.

17. An apparatus as defined in claim 15, wherein:
 said floor plate includes an annular race;
 said foot receiving plate includes an annular race; and
 said anti-friction means includes a plurality of ball bearings retained in said floor plate race and said foot receiving plate race.

18. An apparatus as defined in claim 15, further comprising a handle connected to said foot receiving plate.

19. An apparatus for facilitating rotation of an adjustable foot, comprising:
 a base;
 anti-friction means for positioning between the foot and said base for allowing the foot to rotate with respect to said base when torque is applied;
 a foot receiving plate connected to said base with said anti-friction means disposed therebetween; and
 wherein:
 said foot receiving plate has an opening defined therein; and
 said apparatus further comprises a handle adapted to be connected to said opening in a selected one of a first position, wherein said handle extends from said foot receiving plate so that torque can be applied to said foot through said handle, and a second position, wherein said handle is stored on said foot receiving plate.

20. A method for adjusting the height of an object having at least one adjustable foot without removing the object's weight from the foot, comprising:
 (a) providing a stationary base to rest directly on a floor;
 (b) providing a rotatable coupling having anti-friction means selected from the group consisting of at least one disk of low-friction material and a plurality of ball bearings disposed between said stationary base and the foot to allow the foot to rotate with respect to said stationary base; and
 (c) rotating the foot on said rotatable coupling to change the height of the object.

21. A method as defined in claim 20, wherein said step (b) includes providing a plate mounted on said anti-friction means and receiving the foot within a selected one of a plurality of concentric tiers of said plate.

22. A method as defined in claim 21, wherein said step (c) includes applying a force to a handle connected to said foot receiving plate so that said foot receiving plate and the foot are turned.

23. A method for leveling a pool table including a playing surface and adjustable feet, comprising:
  (a) providing under each of a plurality of said feet a respective apparatus each of which includes a stationary base disposed directly on a floor and a rotatable coupling having anti-friction means selected from the group consisting of at least one disk of low-friction material and a plurality of ball bearings disposed between the base and the respective foot to allow the foot to rotate with respect to the base; and
  (b) rotating selected ones of the feet on their respective rotatable couplings to adjust the pitch of the playing surface until the playing surface is level without lifting up on the pool table during said rotating.

24. An apparatus for facilitating rotation of a foot adjustable relative to an object normally supported at least in part by the foot on a supporting surface, said apparatus comprising:
  a stationary base adapted to be disposed directly on the supporting surface in between the foot and the supporting surface without engaging any part of the object separate from the foot thereof; and
  anti-friction means for positioning between the foot and said stationary base for allowing the foot to rotate with respect to said stationary base disposed directly on the supporting surface when torque is applied, wherein said anti-friction means includes a plurality of ball bearings retained between said base and the foot.

25. An apparatus as defined in claim 24, further comprising a handle, attached to the foot, through which torque can be applied to the foot.

26. An apparatus as defined in claim 24, wherein said base includes an annular shoe overlapping the foot so that said apparatus is secured to the foot.

27. An apparatus as defined in claim 24, further comprising a foot receiving plate connected to said base with said anti-friction means disposed therebetween.

28. An apparatus as defined in claim 27, wherein said base is attached to the foot.

29. An apparatus as defined in claim 27, wherein said foot receiving plate is attached to the foot.

* * * * *